2,967,896
RESOLUTION OF ANTHRACENE OILS USING ZEOLITIC MOLECULAR SIEVES

Raymond N. Fleck, West Covina, and Carlyle G. W'ght and Edward L. Wiseman, Fullerton, Calif., assignors to Union Oil Company of California, Los Angeles, Calif., a corporation of California No Drawing. Filed Mar. 3, 1959, Ser. No. 796,750

13 Claims. (Cl. 260—675)

This invention relates to the separation of aromatic isomers, and in particular concerns a process for the separation of anthracene and phenanthrene by selective adsorption.

The principal source of phenanthrene and anthracene is coal tar where they occur in the anthracene oils (green oil) fraction, usually boiling between about 300° and 360° C. Phenanthrene is used in making dyes, is a stabilizer for explosives and smokeless powder, and has been used in the synthesis of pharmaceuticals, drugs, and organic intermediates. Anthracene has been employed as a stabilizing agent in gasolines, as a constituent in insecticides and fungicides, in the formulation of printing inks and in the manufacture of anthracene dyes. There is no single accepted method for the isolation and purification of phenanthrene and anthracene from anthracene oil. Phenanthrene has been recovered entirely through the use of preferential solvents such as carbon disulfide and furfural. Anthracene can be obtained by crystallization of anthracene salts from a pyridine base or other solvent in which carbazole, a common contaminant, and phenanthrene are more soluble than anthracene. All of these separations involve a combination of operations requiring expensive equipment, severe processing requirements, and extensive staging or repetition of treating steps to produce at best poor yields of marginally pure products. Also, since phenanthrene and anthracene have substantially the same boiling points, fractional distillation does not yield an effective separation.

We have now found that mixtures of anthracene and phenanthrene can be resolved by an adsorptive separation process utilizing a molecular sieve type adsorbent. More particularly, we have found that anthracene can be separated from phenanthrene by a process which comprises: contacting the isomer mixture in either the vapor or liquid phase with a lean molecular sieve adsorbent, hereinafter more fully described, to obtain a rich adsorbent enriched in the more readily adsorbed isomer and an unadsorbed phase enriched in the less readily adsorbed isomer; separating the rich adsorbent from the non-adsorbed phase; and treating the rich adsorbent to desorb the more readily adsorbed isomer therefrom, thereby returning the adsorbent to a lean state for reuse in the next succeeding cycle of operation.

The process of the invention is generally applicable to industrial mixtures of anthracene and phenanthrene. Such isomer mixtures are usually obtained from coal tar distillates but may be found in tar sand, shale oil, bone oils, wood tar, and other natural as well as synthetic sources of aromatic hydrocarbons. The crude isomer mixtures obtained from such sources normally contain 10–50 percent anthracene and 50–90 percent phenanthrene. However, the process is applicable to mixtures containing anthracene and phenanthrene in widely varying proportions. The crude distillates from coal tar often contain other aromatic compounds, particularly carbazole, which occurs in concentrations ranging from 10 to 50 percent by weight. These compounds do not interfere with the process of this invention and usually are found concentrated in the adsorbed fraction.

The adsorbent employed in the present process is a molecular sieve having a pore size between about 7 A. and about 13 A. As a class, the molecular sieve adsorbents are crystalline partially dehydrated zeolitic metallo alumino silicates having pores of substantially uniform diameter which may vary from as small as about 3 A. to about 15 A. or greater, depending upon the identity and proportion of the component elements. It is generally considered that the adsorptive selectivity of molecular sieve adsorbents is due to their containing uniform pores whose diameter is of molecular magnitude. Thus, the ability of a molecular sieve whose pore diameter is about 5 A. to separate straight-chain paraffins from branched-chain paraffins is considered to be due to the fact that the maximum molecular dimension of the straight-chain paraffins is somewhat less than 5 A., whereas that of the branched-chain paraffins is somewhat greater than 5 A. Consequently, the smaller straight-chain molecules can enter and be held in the pores of the 5 A. sieve, whereas the branched-chain molecules are too large to enter pores of such small size. In the present process, however, the adsorbent cannot operate in such manner since the pore size is greater than the minimum molecular dimension of either anthracene or phenanthrene. On the other hand, it does not appear to operate as a conventional adsorbent, i.e., silica gel, activated carbon and the like. British Patent No. 777,233 clearly teaches that the molecular sieves of larger pore diameter preferentially adsorb polar, polarizable and unsaturated molecules and reject non-polar and saturated molecules. From such teachings it would be expected that there would be essentially no adsorptive preference shown for anthracene or its isomer phenanthrene since these compounds do not differ substantially in polarity, boiling point or other properties. As is hereinafter shown, however, we have found that the present class of adsorbents exhibit substantial selectivity with respect to these isomers, anthracene being the most readily adsorbed on the 10 A. pore diameter molecular sieve and phenanthrene being the most readily adsorbed on the 13 A. pore diameter molecular sieve.

As stated, the adsorbents which are employed in accordance with the invention are zeolitic partially dehydrated metallo alumino silicates having pores of a substantially uniform diameter between about 7 A. and about 13 A. Certain naturally occurring minerals can be heated to dehydrate the molecule and obtain an activated zeolitic adsorbent of such type. However, we greatly prefer to employ synthetic materials prepared, for example, as described in the aforesaid British patent. In general, such materials are obtained by heating suitable quantities of alumina and silica with an excess of sodium hydroxide and thereafter washing out the excess caustic to obtain a so-called "Type X" synthetic crystalline zeolitic sodium alumino silicate having the approximate molecular structure of $[6Na_2O \cdot 6Al_2O_3 \cdot 15SiO_2]$ on a water-free basis, and having substantially uniform diameter pores of about 13 A. The uniform pore diameter of this product can be altered by exchanging part of the sodium cation with other metals. For example, such product can be treated with a concentrated solution of a calcium salt, e.g., calcium chloride, at super-atmospheric pressure and at 20° C.–175° C., washed with water to remove excess calcium chloride, and thereafter partially dehydrated by heating to obtain a calcium sodium alumino silicate having a pore diameter of about 10 A. and having a typical average molecular structure on a water-free basis corresponding to $$[6CaO \cdot 6Al_2O_3 \cdot 15SiO_2]_{0.9}[6Na_2O \cdot 6Al_2O_3 \cdot 15SiO_2]_{0.1}$$

Other cations such as magnesium, strontium, and barium may be employed instead of calcium. While any molecular sieve having a pore diameter between about 7 A. and about 13 A. may be employed in accordance with the invention, it is preferred to use the 10 A. calcium sodium alumino silicate or the 13 A. sodium alumino silicate referred to above. These particular products are available commercially under the trade names "Molecular Sieves 10X" and "Molecular Sieves 13X" and may contain substantial amounts of inert binder materials.

The optimum particle size of the adsorbent will depend upon the manner in which it is used in the process, i.e., as a fixed compact bed, a fluidized bed, etc., but is usually between about 2 and about 400 mesh, preferably between about 4 and about 30 mesh for fixed and moving compact beds and between about 100 and about 300 mesh for fluidized beds.

The adsorbent is preferably employed in the form of a dense compact fixed or moving bed which is alternately contacted with the feed and then desorbed. In the simplest embodiment of the invention, the adsorbent is employed in the form of a single static bed, in which case the process is only semi-continuous. Preferably, a set of two or more static beds is employed in fixed-bed contacting with appropriate valving so that the feed stream is passed through one or more adsorbent beds while the desorption is carried out in one or more of the other beds in the set. The direction of flow during adsorption and desorption may be either up or down through the adsorbent, but preferably the adsorption is carried out in one flow direction and the desorption in the other. Any of the conventional apparatus employed in static bed fluid-solids contacting may be used. A moving compact bed of adsorbent has a much greater separation efficiency than a fixed compact bed of the same size because of the ability of the former to provide reflux. The moving compact bed is therefore preferable when an extremely high degree of separation is desired.

As previously stated, the mixture of anthracene and phenanthrene is contacted with the adsorbent in either the vapor or liquid phase. The pressure is usually near atmospheric but may be either subatmospheric or superatmospheric. In general, the adsorption can be carried out at any temperature below that at which the feed components decompose but is usually effected at a temperature between about 40° C. and about 400° C., and at pressures between about atmospheric and about 1,000 p.s.i.g., preferably between 0 p.s.i.g. and 100 p.s.i.g. The immediate products of the initial adsorption stage are an unadsorbed phase which is rich in the least readily adsorbed component of the feed mixture, and a solid adsorbent containing an adsorbate rich in the most readily adsorbed component. The solid and unadsorbed phases are separated, and the latter is passed to storage as the purified product of the process. The rich adsorbent, on the other hand, is treated to desorb the material adsorbed thereon and to return it to a lean state for reuse. According to one mode of operation, such treatment merely comprises subjecting the rich adsorbent to an elevated temperature and/or reduced pressure. The use of elevated temperatures and/or reduced pressures may also be combined with the use of a stripping gas in the known manner.

In accordance with a preferred mode of operation the rich adsorbent is treated with a displacement exchange fluid usually at approximately the same temperature as that employed in the initial adsorption step. The displacement exchange fluid is any material which is inert with respect to the adsorption of the feed mixture, is adsorbable by the adsorbent, and is readily separated from the components of the feed mixture by distillation, absorption, or other conventional means. Preferably, the displacement exchange fluid is one which has a boiling point substantially outside the boiling range of the feed mixture and has an adsorbability substantially the same as that of the adsorbed components of the feed mixture. Suitable displacement exchange fluids include alkylated pyridines, benzopyridines and alkylated benzopyridines such as quinoline, methylquinolines, dimethylquinolines, isoquinolines, methylisoquinolines, and dimethylisoquinolines. A preferred displacement exchange fluid is quinoline. Other materials which can be employed include aromatic hydrocarbons such as naphthalene, methylnaphthalenes, dimethylnaphthalenes, diphenyl, alkylated diphenyl, diphenylmethane, alkylated diphenylmethane, and ethers such as diphenylether, and derivatives thereof.

The following experimental examples, in which percentages are by weight, specifically illustrate the practice of the invention.

*Example I*

A mixture comprising 50.5 percent anthracene and 49.5 percent phenanthrene is contacted in the vapor phase with a bed of lean "Molecular Sieves 10X" (zeolitic calcium sodium alumino silicate adsorbent) at about 700° F. and atmospheric pressure. The unadsorbed phase is found to contain about 12 percent anthracene and about 88 percent phenanthrene. The rich adsorbent is then stripped with quinoline at about 700° F. and atmospheric pressure yielding an adsorbate substantially enriched in anthracene.

*Example II*

In another run, a "Molecular Sieves 13X" (zeolitic sodium alumino silicate adsorbent) is substituted for the "Molecular Sieves 10X" in an experiment conducted in the same manner and with the same feed as Example I. The resulting unadsorbed phase contains about 54 percent anthracene and about 46 percent phenanthrene. Vacuum stripping of the rich adsorbate at about 700° F. and a pressure of about 10 mm. of mercury absolute yields an adsorbate substantially enriched in phenanthrene.

*Example III*

In another run, the unadsorbed phase of Example I is reprocessed in the same manner as the original feed mixture and a correspondingly higher phenanthrene purity is obtained. The finaly purity of the phenanthrene-rich unadsorbed phase is about 99 percent after two successive stages of treatment.

*Example IV*

Another experiment conducted in the same manner and with the same feed as Example I, except that a pressure of 50 p.s.i.g. and a temperature of about 500° F. is maintained during liquid phase adsorption and stripping, yields essentially the same separation of anthracene and phenanthrene as found in Example I As will be apparent, the process of the invention essentially comprises solids-fluid contacting operations, and any of the various techniques and equipment conventionally applied to such type of operation can be adapted to the practice of the invention without departing from the scope thereof. Thus, while it is often preferred to maintain the adsorbent in the form of a fixed compact bed, the process is nevertheless operable when the adsorbent is maintained in the form of a moving bed, i.e., as a solids-fluid contacting operation in which a compact bed of the adsorbent is passed successively through adsorption and desorption zones where it is concurrently or countercurrently contacted with the feed stream and the displacement exchange fluid, respectively. Also, the solids-fluid contacting operation can be carried out employing fluidized techniques whereby the adsorbent is employed in relatively small particle size and is suspended by the flow of the fluid with which it is contacted.

Other modifications and adaptations which would occur to one skilled in this particular art are to be included in the spirit and scope of this invention as defined by the following claims.

We claim:

1. A process for separating a fluid hydrocarbon mixture comprising the isomers, anthracene and phenanthrene, which comprises contacting said mixture with a solid granular adsorbent consisting essentially of a partially dehydrated crystalline zeolitic metallo alumino silicate having pores of substantially uniform diameter between about 7 A. and about 13 A., whereby there is obtained a rich adsorbent enriched in the most readily adsorbed of said isomers and a fluid raffinate product enriched in the least readily adsorbed of said isomers; and treating said rich adsorbent to remove the most readily adsorbed isomer therefrom as a fluid extract product, the proportions of anthracene and phenanthrene in said extract product being different from the proportions of anthracene and phenanthrene in said raffinate product.

2. A process according to claim 1 wherein said adsorbent essentially comprises a zeolitic sodium alumino silicate having substantially uniform diameter pores of about 13 A., and said most readily absorbed isomer is phenanthrene.

3. A process according to claim 1 wherein said adsorbent essentially comprises a zeolitic calcium sodium alumino silicate having substantially uniform diameter pores of about 10 A., and said most readily adsorbed isomer is anthracene.

4. A process as defined by claim 1 wherein said contacting and said treating are effected at a temperature above the boiling point of the highest boiling component of said mixture.

5. A process as defined by claim 1 wherein said treatment of said rich adsorbent comprises contacting the same with a displacement exchange fluid which is readily separated from said extract product and said raffinate product.

6. A process according to claim 1 wherein said contacting and said treating are carried out at substantially the same temperature and pressure.

7. A process according to claim 5 wherein said displacement exchange fluid is quinoline.

8. A process for treating a fluid hydrocarbon mixture comprising the isomers, anthracene and phenanthrene, which comprises: (1) contacting said mixture with a lean solid granular adsorbent consisting essentially of a partially dehydrated crystalline zeolitic metallo alumino silicate having pores of substantially uniform diameter between about 7 A. and about 13 A. whereby there is obtained a rich adsorbent enriched in the most readily adsorbed of said isomers and a fluid raffinate product enriched in the least readily adsorbed of said isomers; (2) contacting said rich adsorbent with a displacement exchange fluid whereby there is obtained a solid lean adsorbent containing adsorbed displacement exchange fluid and an extract product comprising said more readily adsorbed isomer and said displacement exchange fluid; (3) returning said lean adsorbent to Step (1); (4) separately treating said extract and raffinate products to separate said displacement exchange fluid therefrom; and (5) returning the separated displacement exchange fluid to Step (2), the proportions of phenanthrene and anthracene in said extract product being different from the proportions of phenanthrene and anthracene in said raffinate product.

9. A process according to claim 8 wherein said adsorbent essentially comprises a zeolitic sodium alumino silicate having substantially uniform diameter pores of about 13 A., and said most readily adsorbed isomer is phenanthrene.

10. A process according to claim 8 wherein said adsorbent essentially comprises a zeolitic calcium sodium alumino silicate having substantially uniform diameter pores of about 10 A., and said most readily adsorbed isomer is anthracene.

11. A process according to claim 8 wherein said displacement exchange fluid is quinoline.

12. A process for treating a fluid hydrocarbon mixture comprising anthracene and phenanthrene which comprises: (1) contacting said mixture with a solid granular adsorbent consisting essentially of a partially dehydrated crystalline zeolitic calcium sodium alumino silicate having substantially uniform diameter pores of about 10 A. whereby there is obtained a rich adsorbent containing adsorbed anthracene and a fluid raffinate product rich in phenanthrene; (2) separating said raffinate product from said rich adsorbent, and (3) treating said rich adsorbent to desorb the adsorbed anthracene therefrom.

13. The process for separating a fluid hydrocarbon mixture comprising the isomers anthracene and phenanthrene, which comprises: contacting said mixture with a solid granular adsorbent consisting essentially of a partially dehydrated crystalline zeolitic metallo alumino silicate having pores of substantially uniform diameter between about 7 A. and about 13 A.; and separating the solid phase from the fluid phase, the proportion of said isomers in said solid phase being different from the proportion of said isomers in said fluid phase.

References Cited in the file of this patent

UNITED STATES PATENTS

| | | |
|---|---|---|
| 2,834,429 | Kinsella et al. | May 13, 1958 |
| 2,858,901 | Fort | Nov. 4, 1958 |